(12) United States Patent
Spector et al.

(10) Patent No.: US 8,472,766 B2
(45) Date of Patent: Jun. 25, 2013

(54) WAVEGUIDE COUPLER HAVING CONTINUOUS THREE-DIMENSIONAL TAPERING

(75) Inventors: Steven Jay Spector, Lexington, MA (US); Reuel Bennett Swint, Billerica, MA (US); Milos Popovic, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 251 days.

(21) Appl. No.: 12/855,032

(22) Filed: Aug. 12, 2010

(65) Prior Publication Data
US 2011/0170825 A1      Jul. 14, 2011

Related U.S. Application Data

(60) Provisional application No. 61/274,278, filed on Aug. 14, 2009.

(51) Int. Cl.
*G02B 6/26* (2006.01)

(52) U.S. Cl.
USPC .......... 385/43; 385/129; 438/31; 257/E33.067

(58) Field of Classification Search
USPC ................. 385/43, 129–131, 28, 39; 438/31; 257/E33.067
See application file for complete search history.

(56) References Cited

U.S. PATENT DOCUMENTS

| | | | |
|---|---|---|---|
| 6,240,233 B1 * | 5/2001 | Weinert et al. | 385/131 |
| 6,281,523 B1 | 8/2001 | Iwai et al. | |
| 6,310,995 B1 * | 10/2001 | Saini et al. | 385/28 |
| 6,396,984 B1 | 5/2002 | Cho et al. | |
| 6,483,967 B2 * | 11/2002 | Tang et al. | 385/43 |
| 6,816,660 B2 * | 11/2004 | Nashimoto | 385/131 |

(Continued)

FOREIGN PATENT DOCUMENTS

| | | |
|---|---|---|
| JP | 2601173 B2 | 1/1997 |
| JP | 09218317 A | 8/1997 |
| JP | 2000235128 A | 8/2000 |

OTHER PUBLICATIONS

PCT/US2010/045285 International Search Report, Form PCT/ISA/210 first sheet, second sheet, and patent family index; and Written Opinion of the International Searching Authority, Form PCT/ISA/237 cover sheet, Box No. 1 sheet, Box No. V sheet, and Supplemental Box sheet.

(Continued)

*Primary Examiner* — Ellen Kim
(74) *Attorney, Agent, or Firm* — Theresa A. Lober (57) ABSTRACT

A solid state waveguide coupler is provided including a first coupler end disposed on a solid state material substrate for connection to a first solid state waveguide located on the substrate and a second coupler end disposed on the substrate for connection to a second waveguide located on the substrate. A coupling span, comprising a waveguide material layer on the substrate, is disposed between the first and second coupler ends and tapers between a height of the first waveguide and a height of the second waveguide, tapers between a width of the first waveguide and a width of the second waveguide, and includes curved sidewalls along at least a portion of the tapered coupling span. In a method for fabricating the waveguide coupler, material is isotropically removed from a waveguide material layer on the substrate to produce tapered surfaces between the first waveguide and the second waveguide.

16 Claims, 7 Drawing Sheets

U.S. PATENT DOCUMENTS

| | | | |
|---|---|---|---|
| 6,980,720 B2 | 12/2005 | Gothoskar et al. | |
| 7,190,852 B2 * | 3/2007 | Heim et al. | 385/14 |
| 7,327,910 B2 * | 2/2008 | Forrest et al. | 385/14 |
| 2002/0097941 A1 * | 7/2002 | Forrest et al. | 385/1 |
| 2004/0114869 A1 | 6/2004 | Fike et al. | |
| 2004/0131310 A1 * | 7/2004 | Walker | 385/29 |
| 2006/0285797 A1 * | 12/2006 | Little | 385/43 |
| 2007/0077017 A1 * | 4/2007 | Menon et al. | 385/129 |
| 2007/0286552 A1 | 12/2007 | Aalto | |
| 2010/0067846 A1 * | 3/2010 | Tokushima | 385/14 |
| 2010/0322560 A1 * | 12/2010 | Granestrand et al. | 385/43 |

OTHER PUBLICATIONS

Spector et al., Rib Waveguide to Strip Waveguide Mode Converter Using Local Oxidation of Silicon (LOCOS), 6th IEEE International Conference on Group IV Photonics (GFP 2009), Conf. Proceedings, pp. 83-85,Sep. 9-11, 2009.

Spector et al., Rib Waveguide to Strip Waveguide Mode Converter Using Local Oxidation of Silicon (LOCOS), 6th IEEE International Conference on Group IV Photonics (GFP 2009), Presentation Slides, slides 1-14, Sep. 10, 2009.

Spector et al., Rib Waveguide to Strip Waveguide Mode Converter Using Local Oxidation of Silicon (LOCOS), 6th IEEE International Conference on Group IV Photonics (GFP 2009), Advance listing of conference program, ThB4, Jun. 2009.

Geis et al., "Photonic Components for RF Filtering and Wide-Band Antenna Nulling," Optics in Computing (OC), Optical Society of America, OThA2 pp. 1-3, Washington, D.C., Jun. 2003.

Barkai et al., "Double-Stage Taper for Coupling Between SOI Waveguides and Single-Mode Fiber," Jnl. of Lightwave Tech., vol. 26, No. 24, pp. 3860-3865, Dec. 2008.

Dai et al., "Bilevel Mode Converter Between a Silicon Nanowire Waveguide and a Larger Waveguide," Jnl. of Lightwave Tech., vol. 24, No. 6, pp. 2428-2433, Jun. 2006.

Yariv et al., "Supermode Si/III-V hybrid lasers, optical amplifiers and modulators: A proposal and analysis," Optics Express, vol. 15, No. 15, pp. 9147-9151, Jul. 2007.

Park et al., "A hybrid AlGaInAs-silicon evanescent preamplifier and photodetector," Optics Express, vol. 15, No. 21, pp. 13539-13546, Oct. 2007.

Solehmainen et al., "Development of multi-step processing in silicon-on-insulator for optical waveguide applications," Jnl. of Optics A: Pure and Appl. Optics, vol. 8, pp. S455-S460, Jun. 2006.

* cited by examiner

WAVEGUIDE COUPLER HAVING CONTINUOUS THREE-DIMENSIONAL TAPERING

CROSS-REFERENCE TO RELATED APPLICATION

This application claims the benefit of U.S. Provisional Application No. 61/274,278, filed Aug. 14, 2009, the entirety of which is hereby incorporated by reference.

STATEMENT REGARDING FEDERALLY SPONSORED RESEARCH

This invention was made with Government support under Contract No. FA8721-05-C-0002 awarded by the Department of Defense. The Government has certain rights in the invention.

BACKGROUND

This invention relates generally to silicon photonics, and more particularly relates to silicon waveguides.

Interest in the field of silicon photonics is rapidly growing as the photonics industry seeks to add functionality to photonic chips as well as to reduce manufacturing costs, and as the microelectronics industry seeks to integrate optical data links with integrated circuits to meet bandwidth requirements for, e.g., multi-core processors. A range of silicon optical components including, e.g., modulators, detectors, filters, attenuators, and multiplexors, have been demonstrated.

As the complexity of silicon photonics systems increases, it can be required that an optical signal propagate through silicon waveguides of differing geometry on a single substrate to accommodate the specific requirements of the devices and transmission media on the substrate through which the propagation is directed. As a result, for many applications there is required the ability to convert an optical mode between differing silicon waveguides on a common substrate. The two most common waveguide geometries, the rib waveguide geometry and the strip waveguide geometry, differ in their applicability as well as structure; rib waveguides are characterized by relatively low scattering loss but relatively larger structure, while strip waveguides can be fabricated with very compact structures to enable tight bends in device configurations but with relatively higher scattering loss. It is often required to couple an optical signal between a rib waveguide and a strip waveguide to enable optical propagation between two or more dissimilar devices or transmission media on a substrate.

For example, in the design of a silicon optical delay line, it can be preferred to employ a relatively thicker rib waveguide for straight sections of the delay line, where scattering loss can be minimized over a large fraction of the line, and to employ a relatively thinner strip waveguide for the sections of the delay line that are bent in a compact configuration designed to minimize the device extent.

Similarly, in the endeavor to integrate silicon photonics with III-V light emitting devices, both rib waveguides and strip waveguides can be required. Because silicon, unlike most III-V semiconductors, is characterized by an indirect bandgap, silicon is not an efficient light emitting material, and thus realization of silicon light emitting diodes (LED's) and lasers has historically met with limited success. Until recently, the only option for integration of light emitting devices with silicon photonic components has been a relatively expensive serial pick and place component placement process.

There has recently been demonstrated a hybrid wafer bonding approach for integrating III-V materials with silicon photonics to achieve light-emitting components on silicon substrates. In this approach, silicon waveguide devices are fabricated on a Silicon-On-Insulator (SOI) wafer. SOI turns out to be an ideal platform in which to fabricate integrated photonic components because of the high index of refraction-contrast between silicon, silicon dioxide ($SiO_2$), and air. Such a high index contrast is essential for, e.g., compact routing of optical signals on a chip or for forming high-Q ring resonators to make optical filters. The silicon photonics SOI wafer is bonded to a selected III-V material wafer, e.g., an InP wafer, on which device layers have been epitaxially grown. After bonding is complete, electrical contacts are lithographically patterned on the III-V material to produce a III-V light-emitting device that employs a hybrid III-V/silicon waveguide. With this hybrid III-V/silicon photonics system, the optical mode propagates in a silicon waveguide and couples evanescently through a wafer bond interface to a III-V device that can generate or amplify light. This arrangement requires minimal alignment if the III-V devices are defined lithographically after the bonding step, and being a planar process, the arrangement is amenable to mass production.

The silicon photonic devices in the hybrid III-V/silicon photonics system are typically based on a strip waveguide design, to enable single-mode operation as well as to achieve a compact design. But at the location where an SOI silicon photonics wafer is to be bonded to a III-V material layer, there is required a relatively thick silicon waveguide, such as a rib waveguide, in formation of a hybrid III-V/silicon waveguide, to achieve proper evanescent coupling between the silicon waveguide and the III-V device material at the bonding site. Mode conversion on the SOI wafer between the silicon photonic device waveguide and the silicon configuration at the site of the hybrid III-V/silicon waveguide is therefore required.

Many other silicon photonic applications require mode conversion between differing silicon waveguides in a silicon-based photonics system. As explained above for the hybrid III-V/silicon photonics system as well as for all-silicon photonics devices, e.g., the delay line described above, mode conversion between rib and strip waveguide designs can be required to enable practical realization of the required photonics devices and corresponding photonics system.

SUMMARY

A solid state waveguide coupler is provided including a first coupler end disposed on a solid state material substrate for connection to a first solid state waveguide located on the substrate and a second coupler end disposed on the substrate for connection to a second waveguide located on the substrate. A coupling span, comprising a waveguide material layer on the substrate, is disposed between the first and second coupler ends and tapers between a height of the first waveguide and a height of the second waveguide, tapers between a width of the first waveguide and a width of the second waveguide, and includes curved sidewalls along at least a portion of the tapered coupling span.

In a method for fabricating the solid state waveguide coupler, a waveguide material layer is provided on a solid state substrate and waveguide material is isotropically removed to produce a coupling span having a tapered surface between a height of the first waveguide and a height of the second waveguide and having tapered surfaces between a width of the first waveguide and a width of the second waveguide. Waveguide material is removed to define sidewalls of the first waveguide and to define sidewalls of the second waveguide.

With this fabrication process and with the waveguide coupling span geometry, the waveguide coupler provides superior low-loss performance and convenient implementation for a wide range of applications and waveguide geometries, including rib waveguides and strip waveguides.

Other features and advantages of the invention will be apparent from the following description and accompanying figures, and from the claims.

DETAILED DESCRIPTION

Figure 1A:
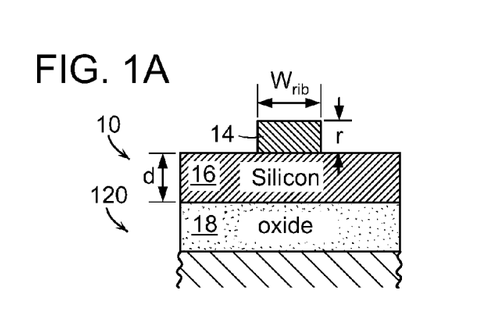
FIGS. 1A-1B are schematic cross-sectional side views of a silicon rib waveguide and a silicon strip waveguide, respectively.
Figure 1B:
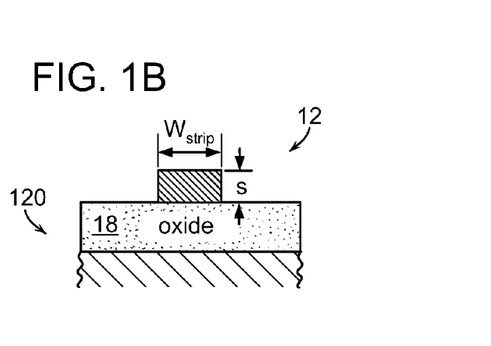

Referring to FIGS. 1A-1B, there are schematically shown axial cross-sectional side views of a silicon rib waveguide 10 and a silicon strip waveguide 12, respectively. The rib waveguide is characterized by a rib 14 having a height, r, and a rib width, $w_{rib}$, with the rib 14 provided on top of a silicon layer 16 having a thickness, d. The strip waveguide 12 is characterized by a strip thickness, s, and a strip width, $w_{strip}$. Both silicon waveguides can be provided on a suitable layer of material that operates as a waveguide undercladding layer, e.g., an oxide layer 18 or other suitable material. Such silicon rib and strip waveguide configurations can be conveniently fabricated employing, for example, a silicon-on-insulator substrate (SOI) 20 or other arrangement, as described in detail below. Herein the term "substrate" is meant to refer to any suitable structure on which a waveguide is disposed, whether such substrate is a SOI substrate or otherwise.

Figure 2A:
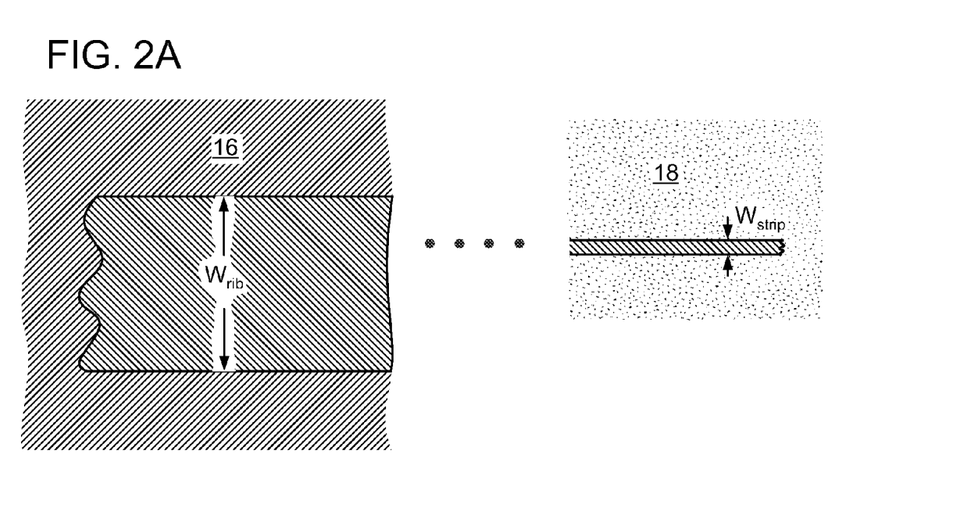
FIGS. 2A-2B are schematic planar top-down views of the rib waveguide and the strip waveguide of FIGS. 1A-1B, respectively.
Figure 2B:
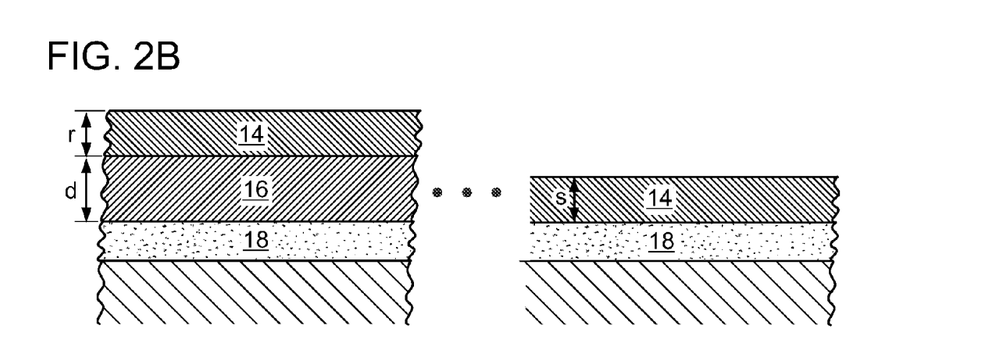

For many photonics applications, it can desirable to structurally transition between the rib and strip waveguide geometries on a single substrate to accommodate the requirements of photonic devices or optical transmission configurations disposed on the substrate while maintaining continuous optical transmission between the devices and configurations. As shown in the plan view in FIG. 2A, such a transition requires a shift in width from a rib waveguide width, $w_{rib}$, that can be, e.g., about 3 μm or larger, to a strip waveguide width, $w_{strip}$, that can be, e.g., about 0.5 μm or smaller. As shown in the longitudinal cross sectional view of FIG. 2B, such a transition further requires a shift in height from the total rib waveguide height, d+r, to a strip waveguide thickness s.

For many applications, the rib waveguide height, d+r, can be substantially the same as the strip thickness, s; the width of the rib, $w_{rib}$, can be substantially the same as the width of the strip, $w_s$; or the height of the rib, r can be substantially the same as the strip thickness, s. It is not required that each geometric feature of the waveguides be distinct in making a transition between the waveguides.

Figure 3A:
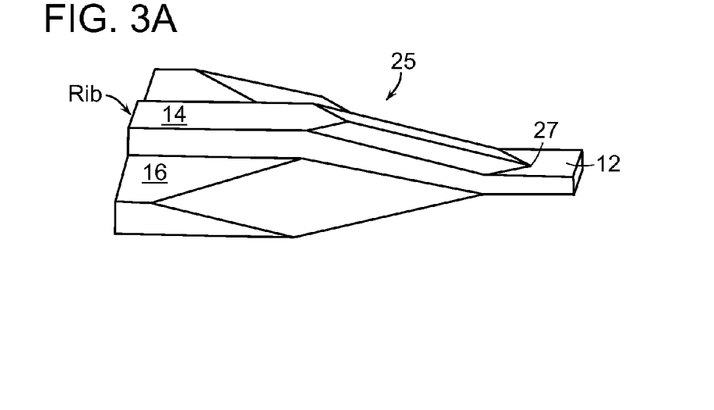
FIGS. 3A-3B are schematic perspective views of a waveguide coupler providing a structural transition between a rib waveguide and a strip waveguide, shown with artificially sharp plane edges and with more realistic smooth surfaces, respectively
Figure 3B:
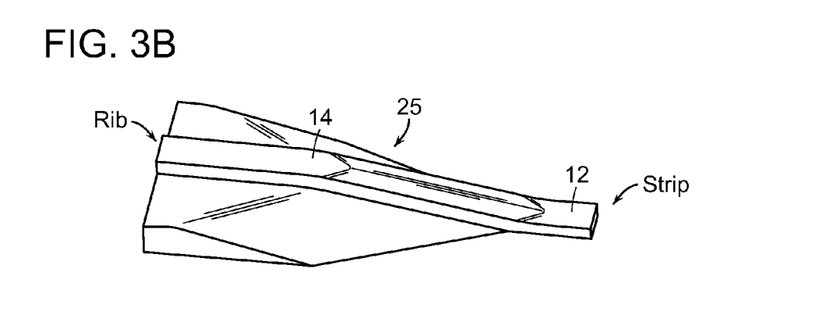

As shown in the schematic perspective views of FIGS. 3A-3B there is provided a structural transition configuration that can be disposed between a rib waveguide 10 and a strip waveguide 12 to couple the two waveguides with a waveguide coupler 25 that is characterized by a continuous, smooth structural transition between the geometry of a rib waveguide 10 and the geometry of a strip waveguide 12. The view in FIG. 3A shows edges that are artificially sharp shown at intersecting planes in the structure for clarity, while the view in FIG. 3B hides such artificial edges to render a more realistic view of the structure 25.

The waveguide coupler 25 transitions from the height of the rib waveguide to the height of the strip waveguide as a taper without any direct vertical drop between the top surface of the rib and the top surface of the strip; i.e., there exists no purely vertical discontinuity or vertical wall in the structure between the top surfaces of the two waveguides. Similarly, the waveguide coupler transitions with a tapered surface from the width of the rib waveguide rib 14 and the extent of the lower silicon layer 16 of the rib waveguide to the width of the strip waveguide 12 without any lateral interrupt in geometry; i.e., between the lateral edges of the two waveguides there exists no purely horizontal edge in the structure. The coupler 25 makes a final transition between the rib and the strip at a nano-scale tapered point 27 that minimizes any transmission loss associated with the finite width and height of the final angled transition taper between the two waveguides. The waveguide coupler thereby provides a continuous three-dimensional taper between a rib waveguide structure and a strip waveguide structure, minimizing optical loss associated with the shifting of an optical mode between the two waveguide structures.

The views of the waveguide and coupler geometries in FIGS. 3A-3B are very distorted to enable the depiction of both rib and strip waveguides at ends of a waveguide coupler 25. In practice, the region of the coupler 25 between the two waveguides can be at least about 100 µm in length to enable adiabatic transitioning between the two waveguides. But for any selected waveguide coupler length, the vertical and lateral transition between the two waveguides is completely continuous, with no purely vertical walls between the top surface of the rib waveguide and the top surface of the strip waveguide, and no purely horizontal walls between the sides of the rib waveguide and the sides of the strip waveguide.

This coupler geometry can be employed for making a structural transition between a rib waveguide and a strip waveguide, as shown in FIGS. 3A-3B, and also can be employed for providing a transition between two strip waveguide thicknesses; between two rib waveguide rib thicknesses; or other waveguide transition. In other words, it is not required that a first of two waveguides to be coupled be a rib waveguide while the second be a strip waveguide; any two waveguides for which a transition in vertical and/or lateral geometry is required can be addressed by the waveguide coupler 25. In the discussion below, coupling between a rib and a strip waveguide is described for clarity, but such is not required. The coupler geometry and associated fabrication process can be employed for coupling between any two different waveguide geometries for which continuous tapering is desired.

In one example method for forming the waveguide coupler 25, the three-dimensional continuity and finely tapered point of the coupler is produced by a process step of isotropic removal of a waveguide material layer, which for many fabrication processes, is a solid state substrate material. For a selected substrate material, a suitable isotropic etchant or oxidation process can be selected to achieve such isotropic substrate removal.

Figure 4:
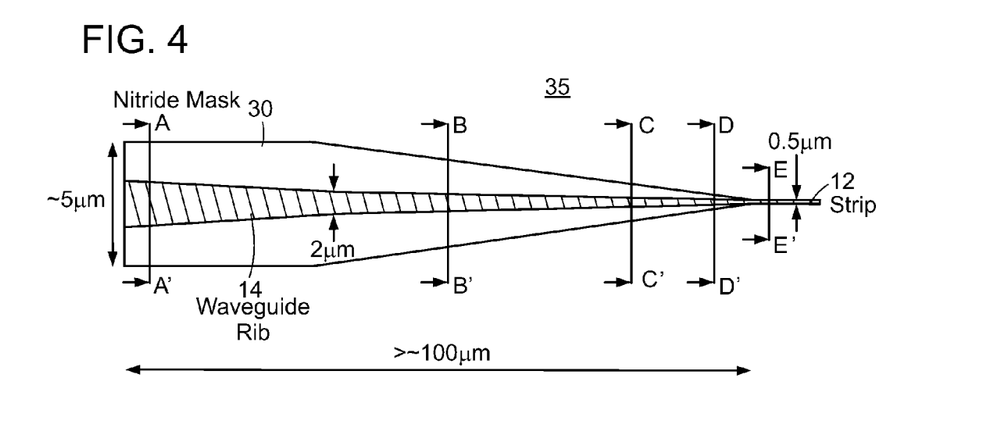
FIG. 4 is a schematic planar view of a lithographic mask employed in a LOCOS process for producing the rib waveguide and the strip waveguides shown under and at sides of the mask in the FIG. 4.

In one example of isotropic removal for a silicon waveguide material layer or substrate, there is employed the localized oxidation of silicon (LOCOS) to consume silicon in an isotropically continuous and three-dimensional manner. FIG. 4 is a planer top-down view of a mask geometry 30 that can be employed with a LOCOS process step to produce the coupler 25. The mask 30 is provided on a silicon layer 35 to be etched in formation of both a solid state silicon rib waveguide 14 and a solid state silicon strip waveguide 12 as well as the solid state silicon coupler 25 between the waveguides. The geometry of the mask 30 is selected such that a combination of a LOCOS process and a final waveguide etch step employing a second mask, not shown in this figure, together produce a preselected height and width for the rib waveguide rib 14 on a silicon layer 16 and simultaneously produce a preselected thickness for the strip waveguide 12, with a continuous transition between the two waveguides across a waveguide coupling span.

At the rib waveguide end of the coupler 25, the width of the mask 30, e.g., 5 µm, is larger than the mode size of the rib waveguide. The width of the mask narrows along the length of the substrate region to be defined as the coupler. To maximize the coupler performance, the width of the narrow end of the mask, at the strip waveguide end of the coupler, can be smaller than the amount of silicon expected to be consumed in the LOCOS process. This amount of consumed silicon is determined by the difference between the total rib waveguide thickness, $d+r$, and the strip waveguide thickness, $s$. For example, given a LOCOS wet oxidation step at 1100° C. for 207 minutes, 1245 nm of oxide is grown, consuming 560 nm of silicon. This results in a transition from a total rib waveguide thickness of 800 nm to a strip waveguide thickness of 240 nm.

It can be preferred for many applications to design the coupler mask such that the coupler height is not equal to the coupler width along the coupling span length. With such a condition met, the TE and TM indices do not cross along the coupling span, and accordingly, the transfer of optical power between the TE and TM modes is prohibited along the coupling span.

Figure 5A:
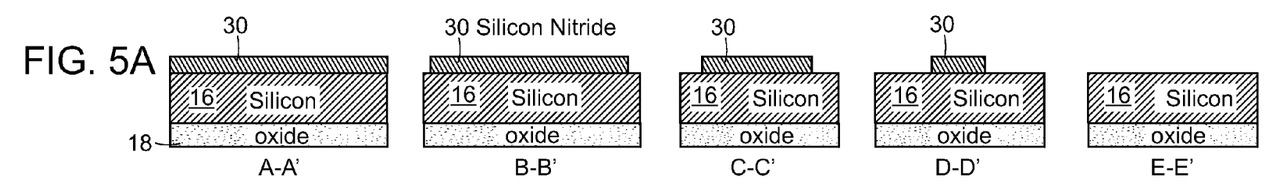
FIGS. 5A-5C are schematic cross-sectional side views of a SOI substrate at three points in time as the substrate is processed to produce the rib and strip waveguides of FIGS. 1A-1B.
Figure 5B:
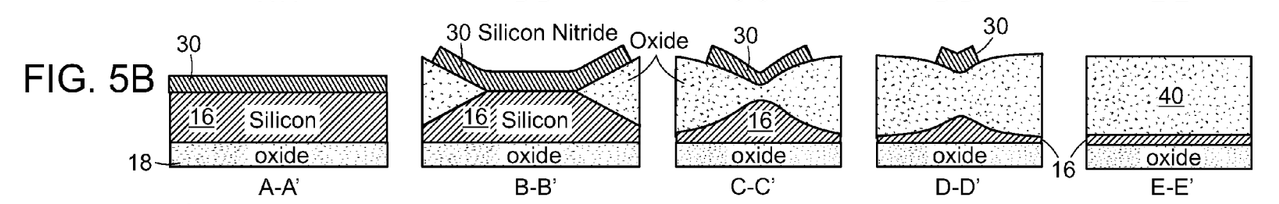
Figure 5C:
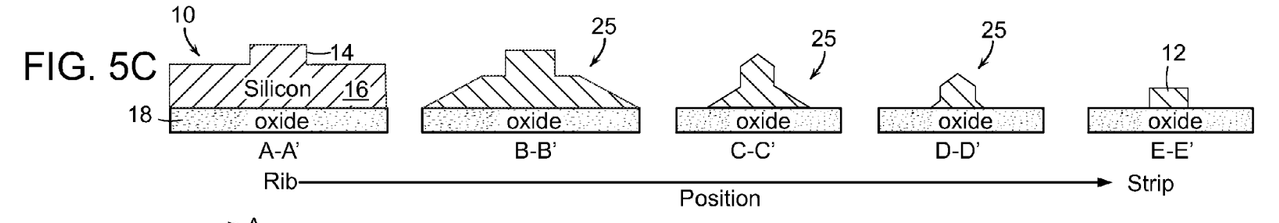
Figure 5D:
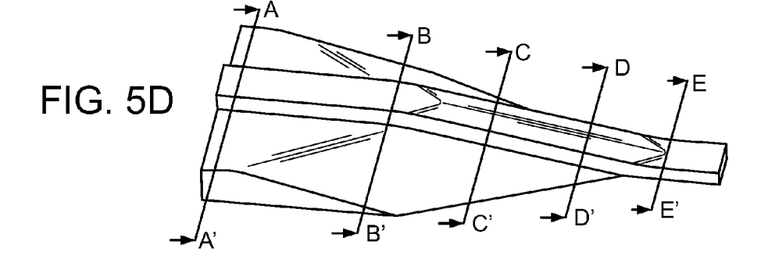
FIG. 5D is a schematic perspective view of a waveguide coupler providing a structural transition between a rib waveguide and a strip waveguide, identifying the five cross-sections shown in FIGS. 5A-5C.

In one example method employing a LOCOS process for producing both rib and strip waveguides and a waveguide coupler out of silicon waveguide material, there is conducted a series of deposition, lithography, oxidation, and etch steps. Referring to FIGS. 5A-5C there are shown schematic cross-sectional side views of a substrate at selected points in time during the method, at locations on a substrate between a rib waveguide at the left and a strip waveguide at the right, along the span between the two waveguides, including a waveguide coupling span geometry. FIG. 5D as well as FIG. 4 identifies the longitudinal locations at and between the two waveguides at which cross-sectional views are shown in FIGS. 5A-5C.

In this example process, a SOI substrate is employed, as such can be a quite convenient starting material for the production of silicon waveguides for which it is desired to include a silicon dioxide undercladding layer under a waveguide material layer on a substrate. But it is to be recognized that such is not required and that other processes for producing a $Si/SiO_2$ material interface as well as other waveguide material combinations can be employed. Single crystal silicon, amorphous silicon, polycrystalline silicon, and other forms of silicon can be employed.

In a process employing a SOI substrate, an example SOI substrate can include a silicon layer of, e.g., about 840 nm in thickness disposed on a 1500 nm-thick layer of oxide on a thicker silicon substrate layer. If desired, alignment marks or other patterns or devices can be produced on the silicon layer as suitable for a given applications.

As shown in FIG. 5A, a LOCOS mask 30 is then produced on the silicon layer. In one example process, a silicon nitride mask is employed, with a thin layer of oxide provided under the nitride mask to provide an etch stop for patterning of the nitride layer, for stress considerations, or for other consideration, if desired. For example, a layer of thermal oxide of about 35 nm in thickness can be produced on the silicon layer by, e.g., a dry oxidation step at 1000° C. for about 36 minutes. Then a silicon nitride layer of about 100 nm in thickness can be produced on the oxide layer by plasma enhanced chemical vapor deposition (PECVD) or other suitable process, e.g., with a 1000 sccm flow of $N_2$, a 280 sccm flow of $SiH_4$, and a 1800 sccm flow of $NH_3$, which deposits nitride at a rate of about 7.3 nm/s. The nitride layer is then etched with conventional photolithographic and dry etch or other processes to form a selected mask geometry. For example, the nitride can be dry-etched in a 30 sccm flow of $C_4F_8$, 10 sccm $CF_2H_2$, 30 sccm of CO, and 80 sccm of AR. This gas combination etches the nitride at a rate of about 3 nm/s. FIG. 5A illustrates the cross-sectional geometry of the patterned mask 30 on the silicon layer 16 atop the oxide layer 18. Specifically, at each cross-section A-A', B-B', C-C', D-D' and E-E' there is shown the cross-sectional extent of the mask that is shown in planar view in FIG. 4.

A LOCOS process is then conducted with the mask in place. In one example LOCOS process a wet oxidation process step is conducted, e.g., at a temperature of about 1100° C. The duration is selected based on the desired waveguide geometries, e.g., for a duration of about 205 minutes in steam. Such a process consumes about 560 nm of the silicon layer and grows about 1240 nm of thermal oxide. As shown in FIG. 5B, at cross-section A-A', where the silicon layer is completely masked, no oxide grows. At the other end of the coupler, at cross-sectional point E-E', where no mask is provided, the silicon layer 16 is uniformly consumed in the formation of a thermal oxide layer 40. At points between A-A' and E-E', the LOCOS process isotropically consumes the silicon layer 16 first at locations outside of the mask and then at points under the mask, forming the characteristic so-called "bird's beak" as the oxide layer 40 grows atop the silicon and under the mask, as shown at cross-sectional points B-B', C-C', and D-D'. Note that the underlying silicon layer 16 takes on a curved sidewall in three-dimensional profile that results from the silicon consumption under the mask; that is, the curved tapered walls shown in FIGS. 3A-3B form from both vertically and laterally as the LOCOS process progresses.

At the end of the LOCOS process, the nitride masking layer and the thermally grown LOCOS oxide are removed, e.g., with a short buffered oxide etch (BOE), e.g., of a 50 second duration, followed by a hot phosphoric acid etch for a duration of about 30 minutes at a temperature of about 165° C., followed by a longer BOE etch, of a 15 minute duration. This sequence of etch processes removes the nitride and oxide layers atop the now-tapered silicon layer.

In a final process, the waveguides are etched with a single waveguide mask pattern that defines the rib waveguide rib width and the strip waveguide strip width. The mask for this etch can change in width along the coupler length to couple waveguides that are of differing widths. The position along the coupler length at which the width change is made is not critical, and can be located even before or after the transition to, e.g., a rib or strip waveguide.

With the selected waveguide mask in place, conventional lithographic processes and plasma etching to achieve straight and smooth sidewalls can be employed preferably. For coupling between a rib waveguide and a strip waveguide, the depth of this waveguide etch is determined by the rib thickness, r. It is required that the thickness of the rib, r, be greater than the thickness of the strip, s, for the area of substrate surrounding the strip to be completely removed by the etch. The waveguide etch also needs to be selective for silicon over oxide so as not to etch the oxide if s is significantly less than r.

In one example etch process there is employed a 37.5 sccm flow of $Cl_2$, a 135 sccm flow of HBr, a 6 sccm flow of He, and a 1.5 sccm flow of O. This etches the silicon at a rate of about 3.5 nm/s. It is recognized that after the LOCOS thinning of the silicon layer 16 the topography of the silicon layer is significantly non-planar and is correspondingly complicated for the waveguide mask lithography. Planarization or other process can be therefore preferably employed here if desired to aid in the waveguide lithography. The final waveguide etch step is preferably a timed etch that sets of the rib height. Given that the underlying oxide layer 18 is an etch stop to the selected silicon etch species, then if the strip waveguide thickness is smaller than the rib height the strip thickness will be preserved and the surface of the oxide layer 18 around the strip will be cleared.

FIG. 5C provides cross-sectional views of the rib waveguide 10, the strip waveguide 12, and the waveguide coupler 25 at cross-sectional points A-A', B-B', C-C', D-D', and E-E' in FIGS. 4 and 5D at completion of the waveguide etch. With this step, all of the rib waveguide, strip waveguide, and waveguide coupler are complete. Note at cross-sectional points B-B', C-C', and D-D' that the waveguide coupler transitions both vertically and horizontally between the two waveguide structures with curved taper sidewalls.

Figures 6A, 6B, 6C, 6D, 6E, 6F, 6G, 6H:
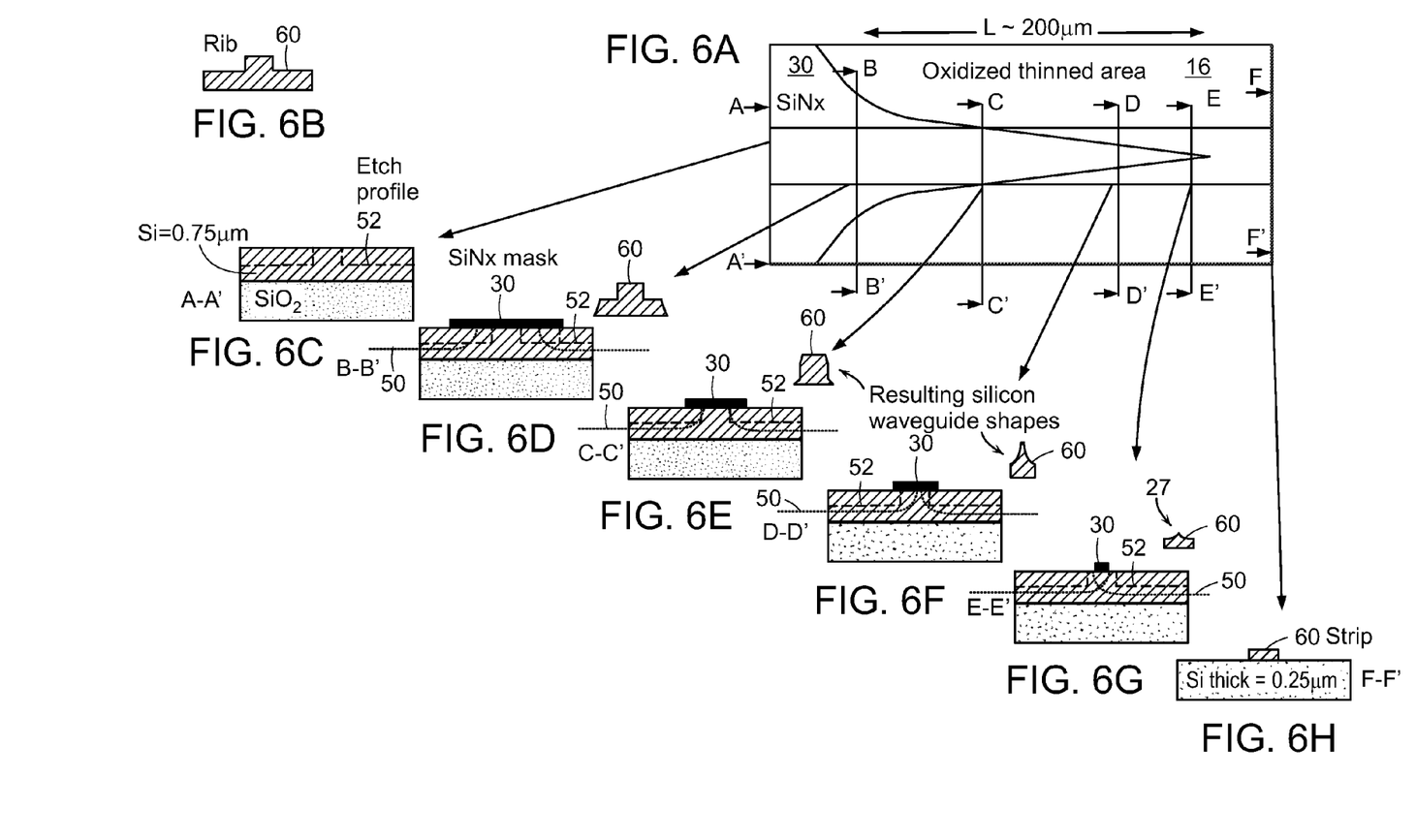
FIG. 6A is a planar top-down view of lithographic mask employed in a LOCOS process for producing the rib waveguide and the strip waveguides and identifying six cross-sections shown in FIGS. 6B-6H.
FIGS. 6B-6H are schematic cross-sectional side views of a SOI substrate, depicting the oxidation front of a LOCOS process and the etch profile of a waveguide etch for producing the silicon profile shown in FIGS. 6B-6H for the cross-sections identified in FIG. 6A.

FIG. 6A provides a planar view of the a masking layer 30 over a silicon layer 16 and FIGS. 6B-6H show two-dimensional cross-sectional views taken at the points A-A', B-B', C-C', D-D', E-E', and F-F' in FIG. 6A, respectively, illustrating the oxidation front 50 that the LOCOS process produces as well as the etch profile 52 of the final waveguide etch step. The silicon waveguide and coupler shapes 60 at each of the cross-sectional views are also shown. These cross-sectional views highlight that the LOCOS etch front is isotropic and thus is a curved front under the mask. As a result, the LOCSO carves the silicon layer 16 in a continuous curved taper; the coupling span tapered walls are curved, not flat, and portions of the sidewall profile are isotropic with regard to the vertical and horizontal directions.

FIG. 6G particularly highlights the production of the taper point 27 shown in FIGS. 3A-3B. In FIG. 6G there is shown the LOCOS oxidation front profile under the LOCOS mask. The oxidation front profile from each lateral side of the structure, as well as from the strip side of the structure, crosses under the mask 30. The resulting silicon feature, at the tip 27 of the coupler, is therefore smaller than the tip of the mask 30. In other words, with the mask geometry and size defined in the manner given above, the LOCOS process results in a silicon taper point 27 at the final transition to the strip waveguide that is smaller than the mask 30. The curvature at the taper point 27 and the nano-scale of the taper point are enabled by the LOCOS process and the selected mask geometry.

Figure 7A:
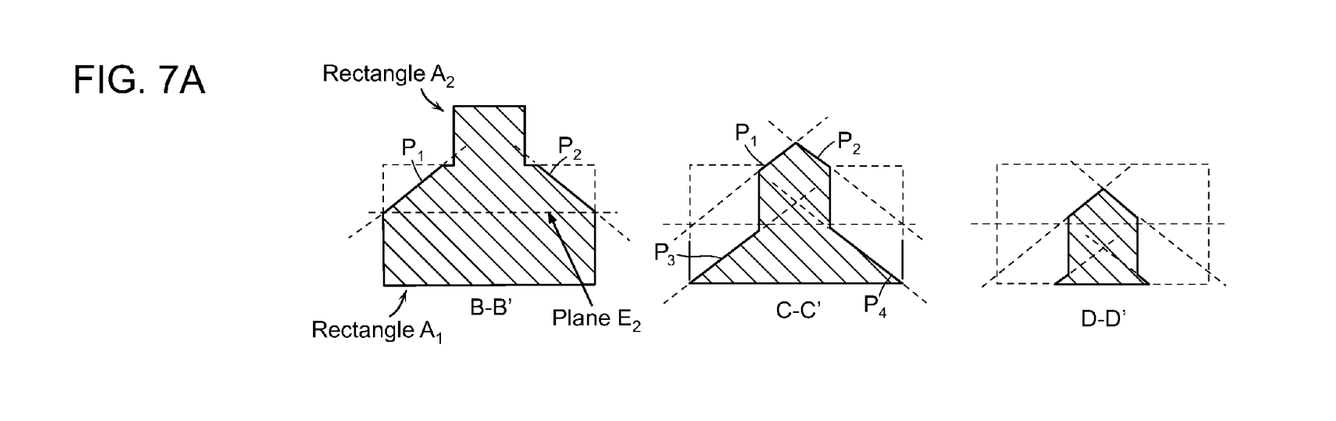
FIG. 7A is a schematic geometric plot of the cross-sectional profile of the waveguide coupler of FIGS. 3A-3B for three of the cross-sections identified in FIG. 5D.
Figures 7B, 7C:
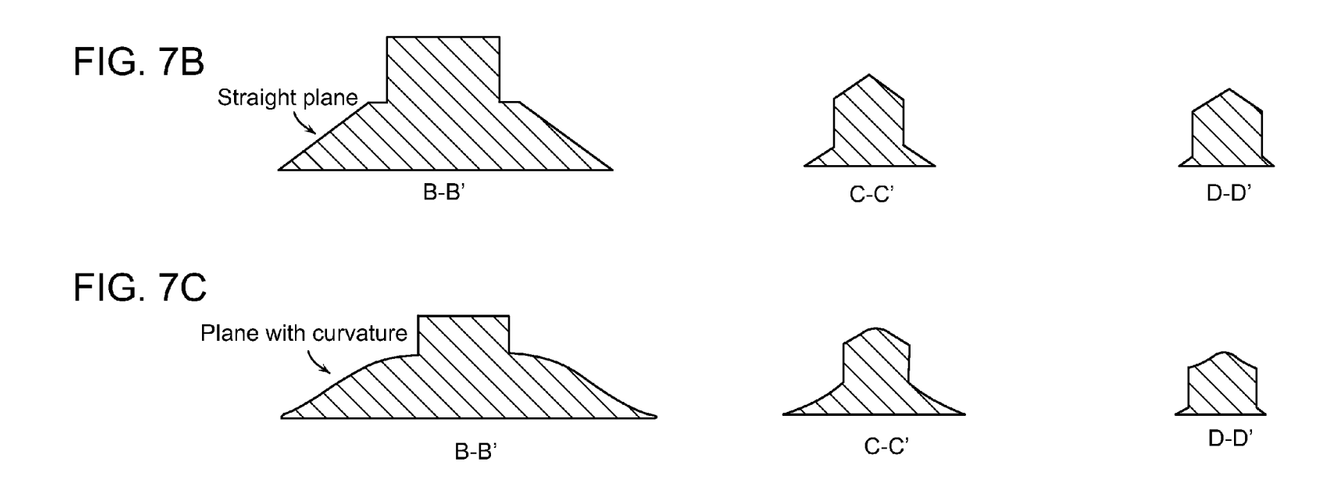
FIGS. 7B-7C are schematic cross-sectional side view profiles based on the geometric plots of FIG. 7A.

FIGS. 7A-7C further emphasize the geometry of the coupling span's continuously tapered walls. FIG. 7A is a theoretical geometric construction illustrating how the LOCOS process and final waveguide etch together produce a coupler cross-sectional profile, corresponding to cross-sectional views taken at the points B-B', C-C', and D-D' in FIGS. 4, and 5D, and as shown in FIG. 5C after the final waveguide lithography and etch. For clarity the planes are shown artificially straight rather than curved. Note that the final coupler profile is the intersection of two sets of intersecting planes, with the rib waveguide including two rectangles $A_1$ and $A_2$ and the angled planes $p_1$ and $p_2$ intersecting the upper rectangle $A_2$ and a plane $E_2$. Along the coupler, the LOCOS process produces planes $p_1$ and $p_2$, and for the silicon layer underlying the rib waveguide rib produces additional planes $p_3$, $p_4$. As the angled planes, representing the LOCOS oxidation front, move toward each other, the coupler structure becomes smaller both horizontally and vertically. At some point, the planes intersect completely to form the taper point 27 in FIGS. 3A-3B, producing continuous vertical and horizontal transition to the location of the strip waveguide.

FIGS. 7B-7C schematically illustrate the corresponding silicon cross-sectional profile for each of the two cross-sectional views taken at the points B-B', C-C', and D-D' in FIGS. 4, and 5D, as shown in FIG. 5C after the final waveguide lithography and etch. The cross-sectional views of FIG. 7B correspond to the theoretical straight-plane geometry of FIG. 7A while the cross-sectional views of FIG. 7C correspond to the curved taper walls of the coupling span, which realistically depict the silicon profile that results from the isotropic LOCOS process. With these cross-sectional views, it is seen that the waveguide coupler profile is characterized by three-dimensional tapers that are curved and that produce no purely vertical surface between the top of the rib and the top of the strip and no purely horizontal surface between the edges of the rib and the edges of the strip.

Processes other than the LOCOS step described above can be employed to produce the three-dimensional tapers of the figures above. For example, isotropic etching of a silicon substrate can be carried out with e.g., a three-way mixture of nitric acid, water, and buffered HF. Isotropic etching of a silicon nitride substrate can be carried out with, e.g., hot phosphoric acid. Anisotropic etchants can also be employed where a sloping, rather than curved sidewall is desired. For example, TMAH, KOH, or other suitable etchant can be employed to anisotropically etch a silicon substrate to produce a coupler profile having smoothly tapered sloped sidewalls. No particular coupler fabrication process is required and any suitable etch, oxidation, or other process step can be employed to produce the coupler geometry.

EXAMPLE

A silicon rib waveguide was designed with a rib height, r, of 0.3 µm, a total rib waveguide thickness of 0.75 µm, and a rib waveguide width of 1.0 µm. A silicon strip waveguide was designed with a strip thickness of 0.23 µm and a strip width of 1.0 µm. A LOCOS fabrication process was employed to produce the waveguides and a coupling span between the waveguides. Three different coupling span lengths were designed, namely, 200 µm, 400 µm, and 800 µm. For each coupler length, sixteen couplers were fabricated between sets of rib waveguides of lengths sufficient to result in a total length of about 1 cm.

The LOCOS and etch processes described above were carried out to produce the couplers and the waveguides. To enhance the smoothness of the waveguide sidewalls, a resist reflow step was carried out for the waveguide lithographic process to enable the production of smooth waveguide sidewall edges by the waveguide etch step.

Figure 8A:
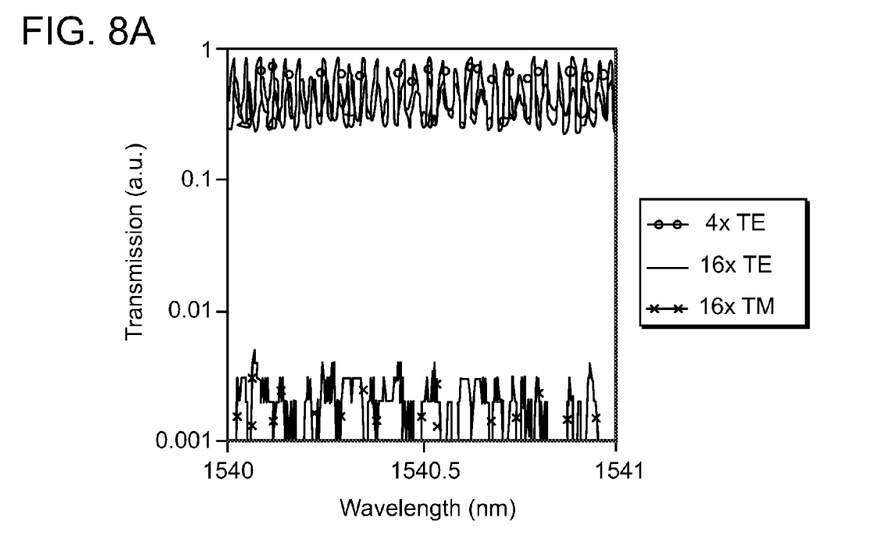
FIGS. 8A-8B are plots of optical transmission as a function of wavelength for TE and TM modes of transmission through an experimental waveguide couplers fabricated with the coupler design of FIGS. 3A-3B for TE and TM modes.
Figure 8B:
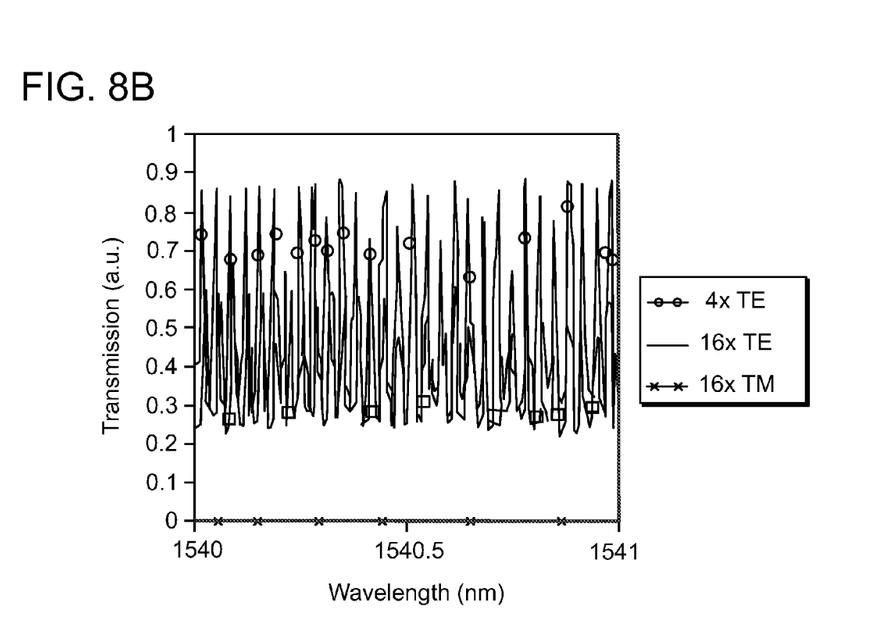

FIGS. 8A-8B present measured transmission characteristics for the fabricated couplers as a function of transmitted wavelength. The Fabry-Perot fringes for transmission through sixteen devices were clean. The optical loss characteristics of the couplers are provided in Table I below:

TABLE I

| Coupler Length | Loss by Transmission (Per Coupler) | Loss by Fabry-Perot analysis (Per coupler) |
|---|---|---|
| 200 µm | 0.02 dB | 0.19 dB |
| 400 µm | 0.10 dB | 0.09 dB |
| 800 µm | −0.13 dB | 0.10 dB |

With this data, it was determined that the average optical loss per coupler was about 0.1 dB. This very low loss provides a superior solution for enabling the coupling of two disparate waveguide geometries with minimal impact on the performance of the photonic system in which the waveguides are employed.

Figure 9:
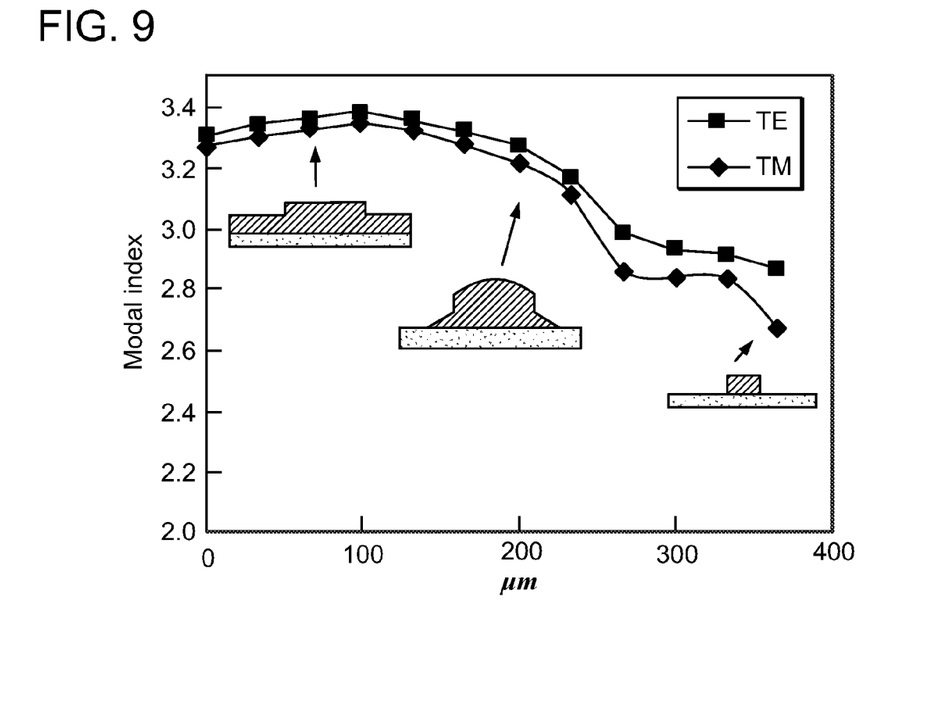
FIG. 9 is a plot of measured modal index as a function of distance along an experimental waveguide coupler fabricated with the coupler design of FIGS. 3A-3B.

FIG. 9 is a plot of the modal index as a function of waveguide coupler position along one of the fabricated 400 µm-long couplers. The TE and TM modes do not cross at any point along the coupler length, thereby preserving the integrity of the modes throughout their transition between two waveguides.

Figure 10:
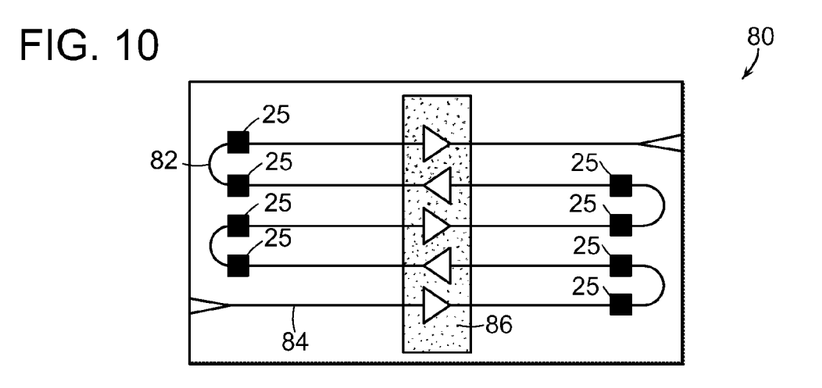
FIG. 10 is a schematic view of a silicon optical delay device including waveguide couplers.

One example application of the waveguide coupler of the Example above is schematically represented in FIG. 10. In FIG. 10 there is shown a silicon delay device 80 including curved strip waveguide sections 82 straight rib waveguide sections 84, and a III-V material gain section 86. With this configuration, there is required a waveguide coupler at each bend in the device to accommodate a transition between a strip waveguide and a rib waveguide. The waveguide coupler 35 of FIGS. 3A-B and described above enables such a transition with a low-loss geometry and elegant implementation.

With this discussion, there is described a coupler for providing a structural transition between two waveguide geometries. The coupler can be employed between strip waveguides of varying thicknesses and/or widths, rib waveguides of varying thickness, heights, and/or widths, or between strip and rib waveguides. In a particularly elegant process for producing the waveguide coupler, a LOCOS step is employed to produce curved tapers in three dimensions along the planes of the coupler. No purely vertical wall exists along the coupler between the top of the waveguides coupled by the coupler, and no purely lateral wall exists along the coupler between edges of the waveguides coupled by the coupler. The final transition to the thinner of the two waveguides is a taper point that is smaller than the lithographic mask employed to define the point. With these geometric considerations, the coupler provides superior low-loss performance and convenient implementation for a wide range of applications and waveguide geometries.

It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A solid state waveguide coupler comprising:
 a first coupler end disposed on a solid state material substrate for connection to a first solid state waveguide located on the substrate;
 a second coupler end disposed on the solid state material substrate for connection to a second solid state waveguide located on the substrate; and
 a coupling span, comprising a waveguide material layer on the solid state substrate, disposed between the first and second coupler ends and tapering between a height of the first waveguide and a height of the second waveguide, tapering between a width of the first waveguide and a width of the second waveguide, and including curved sidewalls along at least a portion of the tapered coupling span.

2. The solid state waveguide coupler of claim 1 wherein the first waveguide, the second waveguide, and the coupling span each comprise the waveguide material layer on the solid state substrate.

3. The solid state waveguide coupler of claim 1 wherein the waveguide material layer comprises a semiconducting material.

4. The solid state waveguide coupler of claim 1 wherein the waveguide material layer is selected from the group consisting of crystalline silicon, polycrystalline silicon, amorphous silicon, and silicon nitride.

5. The solid state waveguide coupler of claim 1 wherein the first waveguide comprises a rib waveguide and the second waveguide comprises a strip waveguide.

6. The solid state waveguide coupler of claim 1 wherein the first and second waveguides each comprise rib waveguides.

7. The solid state waveguide coupler of claim 1 wherein the first and second waveguides each comprise strip waveguides.

8. The solid state waveguide coupler of claim 1 wherein the coupling span taper between a height of the first waveguide and a height of the second waveguide comprises a tapered sidewall including no vertical wall along the coupling span.

9. The solid state waveguide coupler of claim 1 wherein the coupling span taper between a width of the first waveguide and a width of the second waveguide comprises a tapered wall including no horizontal wall along the coupling span.

10. The solid state waveguide coupler of claim 1 wherein the coupling span is characterized by a width and by a height each as a function of span position that prohibits crossing of TE and TM optical modes along the coupling span.

11. The solid state waveguide coupler of claim 1 wherein the coupling span is at least about 100 μm in length.

12. The solid state waveguide coupler of claim 1 wherein at least one of the first and the second coupler ends comprises a tapered point.

13. The solid state waveguide coupler of claim 1 wherein portions of sidewalls of the coupling span are characterized by a profile that is isotropic with respect to vertical and horizontal directions.

14. The solid state waveguide coupler of claim 1 wherein the coupling span is tapered in all three dimensions.

15. The solid state waveguide coupler of claim 1 wherein the substrate comprises a silicon-on-insulator substrate.

16. The solid state waveguide coupler of claim 1 further comprising an undercladding layer on the solid state substrate under the waveguide material layer on the solid state substrate.

* * * * *